United States Patent [19]
Tomita et al.

[11] Patent Number: 6,024,117
[45] Date of Patent: Feb. 15, 2000

[54] VALVE GUIDE STRUCTURE

[75] Inventors: Taku Tomita, Tokyo; Mitsutoshi Araki; Naoyuki Yasuda, both of Ibaraki-ken, all of Japan

[73] Assignee: SMC Kabushiki Kaisha, Tokyo, Japan

[21] Appl. No.: 09/113,156

[22] Filed: Jul. 10, 1998

[30] Foreign Application Priority Data

Jul. 18, 1997 [JP] Japan ................................. 9-194199

[51] Int. Cl.⁷ ............................. F16K 27/02; F16K 27/12
[52] U.S. Cl. ..................... 137/321; 137/505.37; 220/298
[58] Field of Search ............................... 137/116.5, 505, 137/505.37, 505.42; 220/298; 251/321

[56] References Cited

U.S. PATENT DOCUMENTS

| | | | |
|---|---|---|---|
| 841,924 | 1/1907 | Bleoo | 137/505.42 |
| 1,576,686 | 3/1926 | Terry | 137/505.42 |
| 1,758,909 | 5/1930 | Coffin | 220/298 |
| 2,044,276 | 6/1936 | Bukolt | 220/298 |
| 2,211,068 | 8/1940 | McDonald | 137/505.37 |
| 2,707,966 | 5/1955 | Taplin | 137/505.37 |
| 3,001,668 | 9/1961 | Burk et al. | 220/298 |
| 3,823,729 | 7/1974 | Swogger . | |
| 5,107,887 | 4/1992 | White et al. | 137/505.42 |

FOREIGN PATENT DOCUMENTS 30 26 250  2/1982  Germany .

*Primary Examiner*—Stephen M. Hepperle
*Attorney, Agent, or Firm*—Oblon, Spivak, McClelland, Maier & Neustadt, P.C.

[57] ABSTRACT

A recess and another recess having an enlarged diameter with respect to the recess are defined in a main body, wherein a valve guide body is inserted into the recess. Projections of the valve guide body engage inside grooves defined in a wall portion constituting the recess, and second projections of a cover member engage with first projections formed on a wall constituting the other recess, stopping the cover member from falling out. A pressure of a pressurized fluid which is imposed on the valve guide body is supported by the cover member. As a result, there is no concern of damage to the valve guide body, and moreover, there is no concern of unexpected dislocation of the valve guide body.

9 Claims, 11 Drawing Sheets

FIG.14
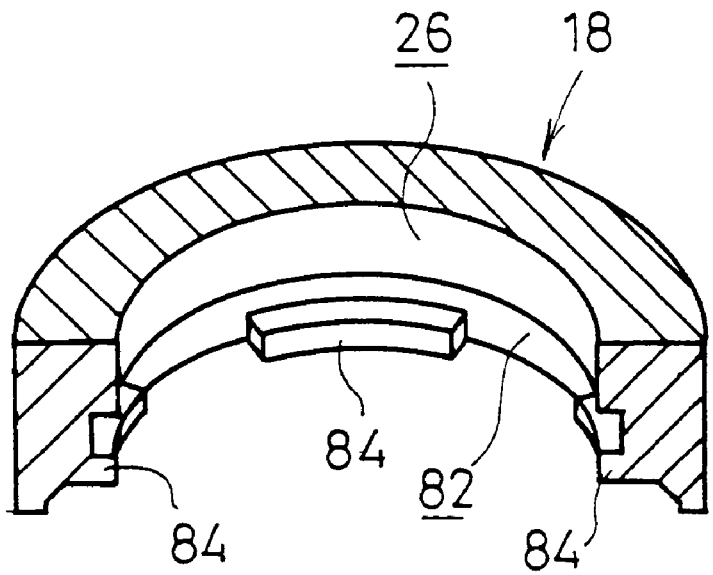
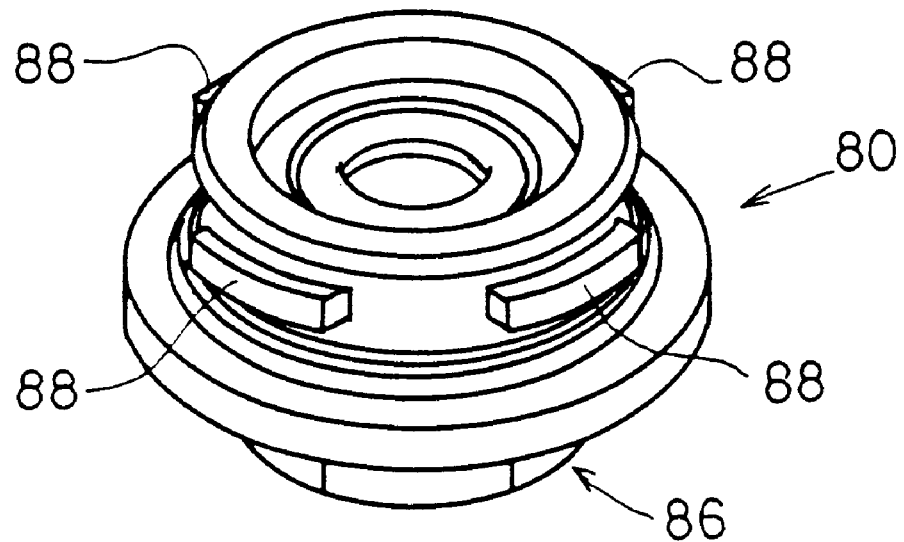

VALVE GUIDE STRUCTURE

BACKGROUND OF THE INVENTION

1. Field of the Invention

The present invention relates to a valve guide structure used in a pressurized fluid control device, such as a pressure reduction valve or the like, and more specifically concerns a valve guide structure for preventing damage to a resin manufactured valve guide.

2. Description of the Related Art

There has hitherto been used a valve guide structure in a pressurized fluid control device, such as a pressure reduction valve or the like. A pressure reduction valve 10 using such a valve guide structure is shown in FIG. 13. The pressure reduction valve 10 includes a main body 18 having a first side port 12 and a second side port 14 defined therein, a bonnet 22 which is fitted to an upper part of the main body 18, and a handle 24 rotatably supported about an axis on an upper part of the bonnet 22.

A recess 26 is defined in a lower part of the main body 18, wherein a circumferential groove 27 is defined around a wall formed in the recess 26. A valve guide body 30 is formed by a resin in order to reduce frictional resistance of the valve body 34, which is slidably inserted into a cavity 32 of the valve guide body 30, and to prevent sticking of the valve body 34. A plurality of hooks 38, which are separated mutually by plural slits 35, are formed in the valve guide body 30, wherein by engagement of the hooks 38 with a wall formed by the groove 27, the valve guide body 30 is stopped from falling out of the recess 26. The valve body 34 is supported by a coil spring 36. A rod-shaped stem 40 is affixed to an upper-central portion of the valve body 34, wherein an end of the stem 40 is formed to have an upwardly tapering reduced diameter.

A chamber 42, through which the stem 40 penetrates and which communicates with the second side port 14, is formed in the main body 18. A seat 44 capable of abutment with an upper surface of the valve body 34 is formed on a lower part of a substantially cylindrically shaped wall of the chamber 42.

A diaphragm 46 extends between the main body 18 and the bonnet 22, wherein a diaphragm chamber 48 is formed by the diaphragm 46 and a recess in the main body 18. A diaphragm pressing member 52 is disposed centrally on the diaphragm 46, wherein a through hole 56 is defined in the center of the diaphragm pressing member 52. A radially downward extending taper 58 is formed by a wall of the through hole 56, wherein an end of the stem abuts inside the taper 58, thereby blocking the through hole 56.

A seat 54 is disposed on top of the diaphragm 46 on the diaphragm pressing member 52, and a pressure adjustment spring 50 is seated on the seat 54, wherein the other end of the pressure adjustment spring 60 engages a pressure adjusting nut 62. The pressure adjusting nut 62 threadedly engages a pressure adjusting screw 64 affixed to the handle 24, so that by turning the handle 24, the pressure adjusting nut 62 is displaced in directions of arrows A and B.

Further, in a valve guide structure 80 according to another conventional technique, as shown in FIG. 14, a large diameter hole 82 communicates with a lower part of a recess 26 of a valve body 18, wherein a plurality of projections 84 are formed along a wall of the recess 82. By contrast, on an outer circumference of the valve guide body 86, projections 88 are formed which are engageable with the projections 84, wherein following insertion of the valve guide body 86 into the hole 26 in a manner such that the projections 88 do not abut with the projections 84 of the recess 82, the valve guide body 86 is rotated a predetermined angle in a circumferential direction thereof, so that the projections 88 of the valve guide body 86 and the projections 84 of the hole 82 engage one another for stopping the valve guide body 86 from falling out.

Further, a valve guide structure 90 according to yet another conventional technique, as shown in FIG. 15, is defined by a groove 92 which surrounds a wall formed by a recess 26 of a main valve body 18, wherein through engagement of a C-shaped stop ring 94 in the groove 92, the valve guide body 96 is prevented from falling out.

Notwithstanding, with the valve guide structures 28, 80, 90 of these conventional techniques, because the valve guide bodies 30, 86, 96 are formed of a resin, when the valve guide structures 28, 80, 90 are subjected to pressure from a pressurized fluid, there is a concern that a corresponding force is concentrated on the valve guide bodies 30, 86, 96, wherein damage to the valve guide bodies 30, 86, 90 can result.

Further, there is a concern of deterioration from changes occurring to the valve guide bodies 30, 86, 96 over time, with the defect that damage to the valve guide body 30, 86, 96 becomes easy due to use thereof over prolonged periods.

Furthermore, although attachment of such valve guide structures 28, 80, 90 is easy, at the same time, there is the concern that the valve guide bodies 30, 86, 96 may unexpectedly become dislocated by becoming loosened or the like.

SUMMARY OF THE INVENTION

A general object of the present invention is to provide a valve guide structure wherein, by supporting through a cover member the pressure of a pressurized fluid imposed on the valve guide body, any concern of dislocation of the valve guide body from the pressurized fluid device is eliminated.

A principal object of the present invention is to provide a valve guide structure in which first mating projections are formed along a wall constituted by an insertion hole of the valve guide body, and wherein through engagement of second mating projections formed on a cover member with the first mating projections, the cover member can be stopped from falling out.

A further object of the present invention is to provide a valve guide structure in which, by engagement of a projection formed on an end of the valve guide body, with a hole or recess defined in the cover member, rotation of the cover member is prevented, and any concern of unexpected dislocation of the cover member from the pressurized fluid device can be eliminated.

A still further object of the present invention is to provide a valve guide structure wherein, by insertion of curved members formed on the cover member into gaps defined between plural mutually adjacent first mating projections, rotation of the cover member is prevented, and any concern of unexpected dislocation of the cover member from the pressurized fluid device can be eliminated.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 14 is a partial expanded exploded perspective view of a pressure reduction valve employing a valve guide according to another conventional technique.

DESCRIPTION OF THE PREFERRED EMBODIMENTS

A structure of the valve guide according to the present invention shall be described in detail hereinbelow with reference to the accompanying drawings in which preferred embodiments thereof shall be presented.

Figure 1:
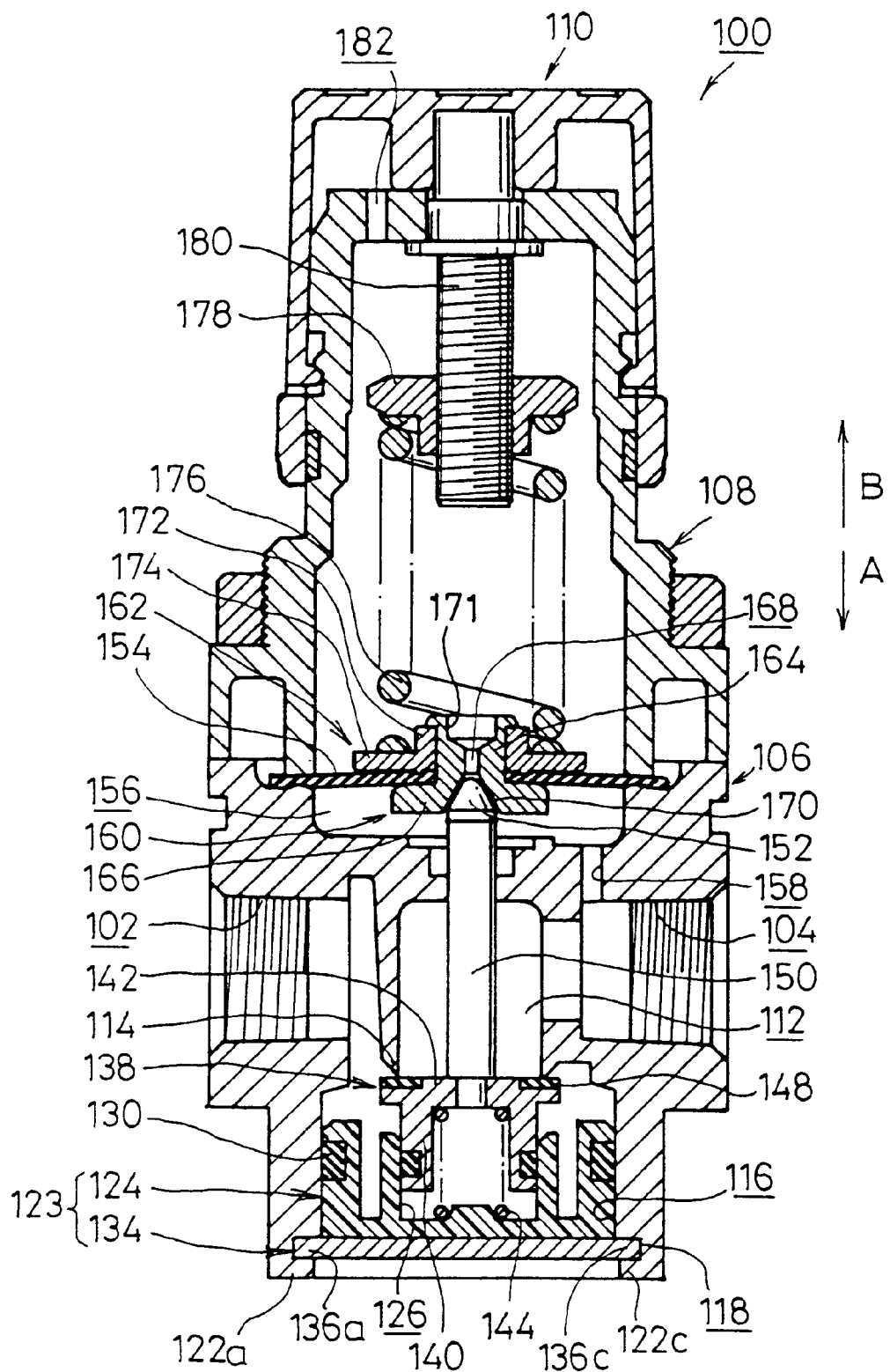
FIG. 1 is a vertical cross-sectional view showing a pressure reduction valve employing a valve guide structure according to a first embodiment of the present invention.

In FIG. 1, reference numeral 100 shows a pressure reduction valve employing a valve guide structure according to a first embodiment of the present invention. Such a pressure reduction valve 100 includes a main valve body 106, having defined therein a first side port 102 and a second side port 104, a bonnet 108 fitted on an upper part of the main valve body 106, and a handle 110 rotatably axially supported on an upper portion of the bonnet 108.

A chamber 112 communicating with the second side port 104 is formed in the interior of the main body 106, and a seat 114 is formed on a lower part of a substantially cylindrical wall of the chamber 112.

Figure 2:
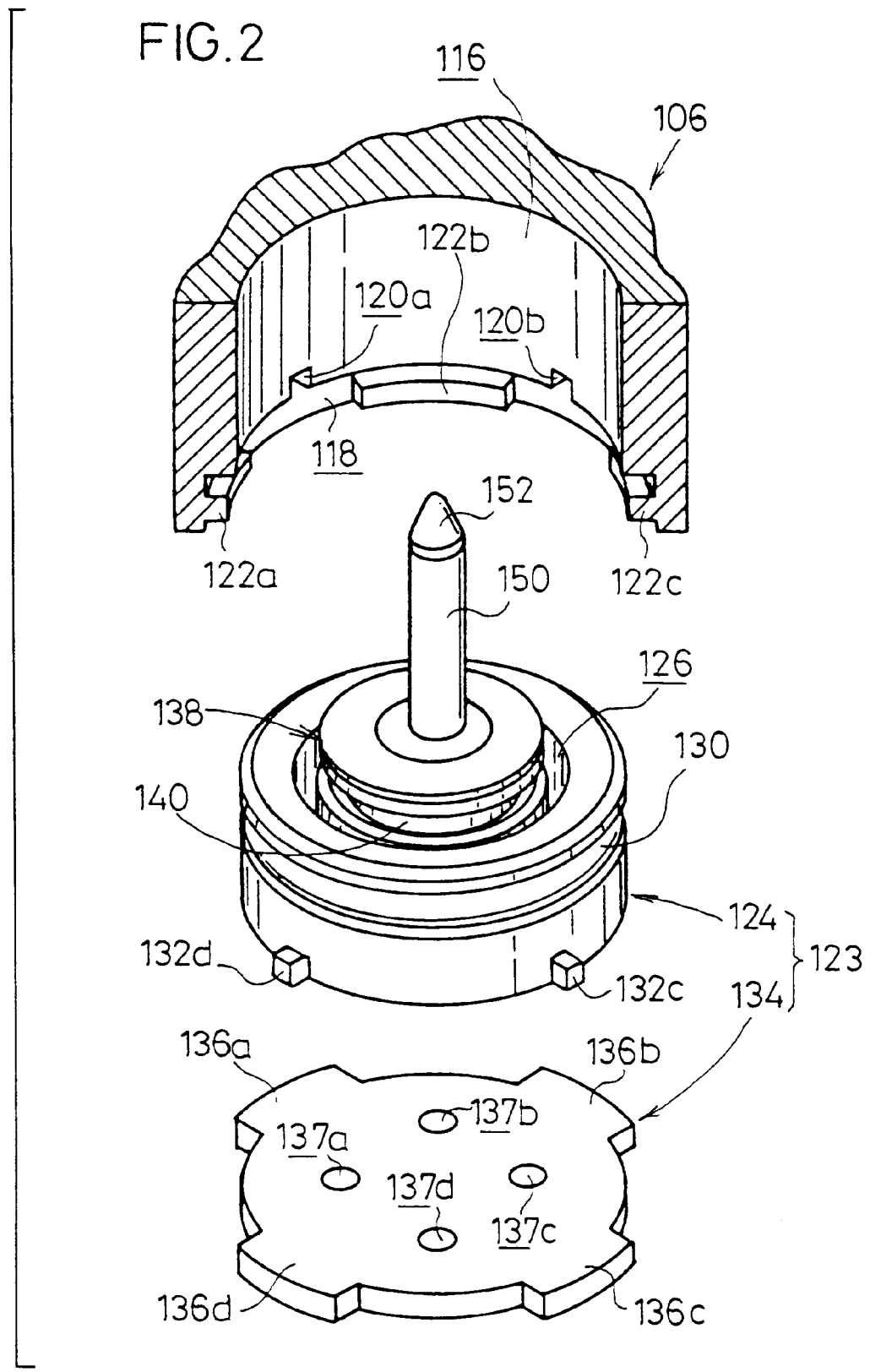
FIG. 2 is an outline exploded perspective view of the valve guide structure of FIG. 1.
Figure 3:
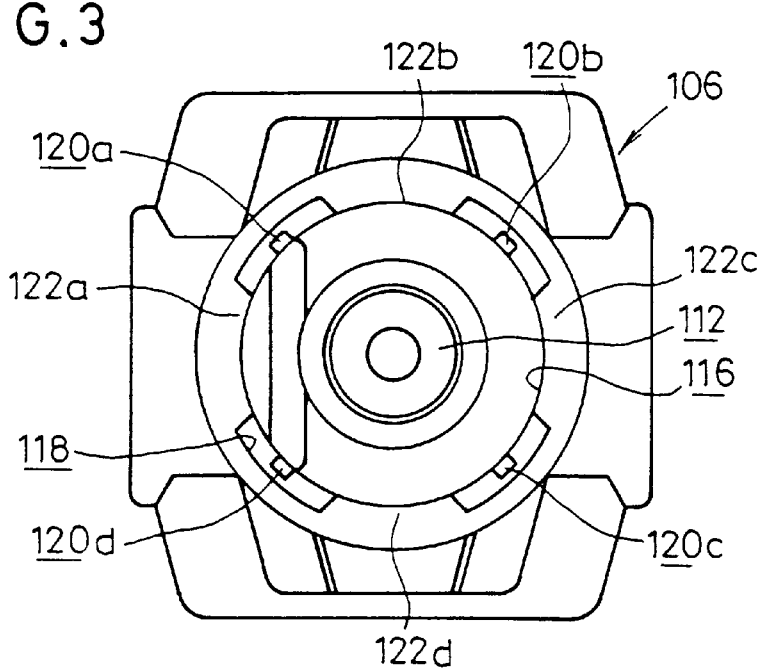
FIG. 3 is a view of a bottom surface of a main body employed in the pressure reduction valve of FIG. 1.

A recess 116 communicating with the chamber 112 downward of the seat 114 is defined in a lower portion of the main body 106, wherein a lower portion of the recess 116, as shown in FIG. 2, communicates with an enlarged diameter recess 118. As shown in FIGS. 2 and 3, a plurality of grooves 120a–120d are defined extending in an axial direction of the wall which constitutes the recess 116, wherein the other recess 118 communicates with a lower part of the grooves 120a–120d. Further, a plurality of first projections 122a–122d are formed extending along a circumferential direction of the wall which constitutes the recess 118, the respective first projections 122a–122d being each mutually offset 90° from each other.

Figure 4:
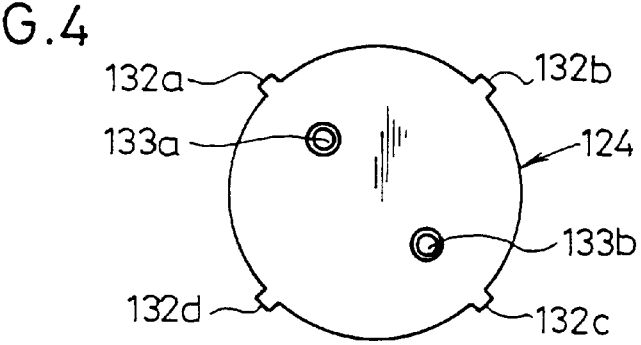
FIG. 4 is a view showing a bottom surface of a valve guide body employed in the pressure reduction valve of FIG. 1.

A valve guide structure 123 according to the present embodiment is constructed within the recess 116, and a valve guide body 124, formed by a resin material, is also fitted therein, wherein a cavity 125 is defined in the valve guide body 124 (See, FIG. 1). An o-ring is disposed on the outer periphery of the valve guide body 124, the o-ring serving to prevent leakage of pressurized fluid. As shown in FIGS. 2 and 4, on the outer periphery of the valve guide body 124 along an axial direction thereof, a plurality of projections 132a–132d, which are engageable within projections 120a–120d, are formed mutually offset 90° from each other. Further, projections 133a, 133b are also formed at a lower end of the valve guide body 124 (See, FIG. 4).

A cover member 134, which constitutes part of the valve guide structure and which is formed of a metallic material, is fitted into the recess 118. A plurality of second projections 136a–136d which are mutually offset 90° from each other, are formed on an outer periphery of the cover member 134, wherein the second projections 136a–136d engage with the first projections 122a–122d which are formed in the recess 118, thereby stopping the cover member 134 from falling out. A plurality of holes 137a–137d which are engageable with the projections 133a, 133b are formed on the cover member 134. On the cover member 134, in place of holes 137a–137d, it is also acceptable to provide cavities 137a–137d (i.e. non-penetrating recesses or blind holes) which are engageable with the projections 133a, 133b.

As shown in FIG. 1, a valve body 138 is slidably inserted in the cavity 126 of the valve guide body 124. The valve body 138 is formed by a tubular-shaped cylinder 140, and a valve main body 142 is integrally formed on top of the cylinder 140. One end of a coil spring 144 is seated onto a lower surface of the valve main body 142, wherein the other end of the coil spring 144 is seated on a bottom part of the cavity 126. As a result, the valve body 138 is normally biased in the direction of arrow B by the coil spring 144. A seal member 148, which is formed in a ring shape and comprises an elastomeric material such as rubber, is disposed on an upper part of the valve main body 142. The seal 148 is capable of abutment with the seat 114. One end of a rod-shaped stem 150 is affixed centrally on the valve main body 142, whereas an upwardly directed reducing diameter taper 152 is formed on the other end of the stem 150.

A diaphragm 154 extends between the main body 106 and the bonnet 108, wherein a diaphragm chamber 156 is formed by the diaphragm 154 and a cavity of the main body 106. The diaphragm chamber 156 communicates with the second side port 104 through a passage 158. A first diaphragm pressing member 160 and a second diaphragm pressing member 162 for supporting the diaphragm 154 are respectively disposed centrally on upper and lower surfaces of the diaphragm 154. A cylindrical member 164, which is fitted into a central hole of the diaphragm 154 and projects from an upper part of the diaphragm, together with an expanded diameter flange 166 which expands from a lower end of the cylindrical member 164 and engages the bottom surface of the diaphragm 154, are formed integrally on the first diaphragm pressing member 160 which supports the bottom surface of the diaphragm 154. A taper 170 which expands progressively downward in diameter is formed by a wall defined in a hole 168 of the cylindrical member 164. The taper 152 of the stem 150 is seated in the taper 170, thereby blocking the hole 168. Further, an expanded diameter portion 171 if formed on an upper part of the wall formed by the hole 168. A further cylindrical member 172, defining a hole in which the cylindrical member 164 is fitted, and a flange 174 which expands in diameter from a lower part of the cylindrical member 172, are formed integrally on the second diaphragm pressing member 162, wherein the flange 174 and the flange 166 of the first diaphragm pressing member 160 sandwich the diaphragm 154 therebetween.

One end of a pressure adjustment spring 176 is seated on an upper surface of the flange 174, and the other end of the pressure adjustment spring 176 is seated onto the pressure adjusting nut 178. The pressure adjusting nut 178 is threadedly engaged with a pressure adjusting screw 180 affixed to a central part of the handle 110, wherein by integrally rotating the handle 110 and the pressure adjusting screw 180, the pressure adjusting nut 178 is displaced in the directions of arrows A and B.

In addition, a relief port 182, through which pressurized fluid is discharged to the outside, is defined on an upper surface of the bonnet 108.

The pressure reduction valve employing the valve guide structure in accordance with the first embodiment of the invention is constructed basically as described above. Next, an explanation shall be provided of the operation thereof.

Beforehand, an unillustrated pressurized air supply source is connected to the first side port 102, and a desired fluid pressure device (for example, a cylinder) is connected to the second side port 104. Further, the handle 110 is turned in a predetermined direction, thereby setting a pressure of the pressurized air supplied to the fluid pressure device. More specifically, with reference to FIG. 1, the handle 110 and pressure adjusting screw 180 are rotated in unison, and when the pressure adjusting nut 178 is displaced in the direction of arrow A, the pressure adjustment spring 176 is compressed, thereby pressing on the diaphragm 154. As a result, the stem 150 is displaced integrally with the valve body 138 in the direction of arrow A, the seal member 148 is separated a given distance from the seat 114, and communication between the first side port 102 and the second side port 104 is established.

After completing the above preparatory steps, when the pressurized air supply source (not shown) is energized, pressurized air is introduced from the first side port 102 and flows to the second side port 104, passing through the chamber 112, and is supplied to the fluid pressure device. In this case, a portion of the pressured air supplied to the second side port 104, is introduced to the diaphragm chamber 156 through passage 158, wherein a pressing force is generated which presses on the diaphragm 154 in the direction of arrow B. Accordingly, the diaphragm 154 and stem 150 are displaced integrally until a position at which such a pressing force and the elastic force of the pressure adjustment spring 176 become evenly balanced, and the valve body 138 is displaced in the direction of arrow B.

If the pressure at the second side port 104 becomes larger than a predetermined value, the valve body 138 displaces further in the direction of arrow B, and the seal member 148 abuts the seat 114 thereby effecting a sealing operation, resulting in interruption of communication between the first side port 102 and the second side port 104. At this time, the pressure of pressurized air supplied to the first side port 102 is impressed upon the valve guide body 124 through the valve body 138. However, because the valve guide body 124 is supported by a metallic cover member 134, there is no concern of damage to the valve guide body 124 and/or the cover member 134 by the pressure of the pressurized air.

Next, an explanation shall be given of the arrangement by which valve guide body 124, constituting the valve guide structure 123, and the cover member 134 are fitted into recesses 116 and 118 of the main body 106.

Initially, the coil spring 144 and valve body 138 are inserted into the cavity 126 of the valve guide body 124. At this time, the stem 150 is affixed to the valve body 128.

Following the above preparatory steps, the valve guide body 124 is fitted into the recess 116 (See, FIG. 2). At this time, projections 132a–132d formed along the outer periphery of the valve guide body 124 slidably engage in grooves 120a–120d, whereby the valve guide body 124 is prevented form rotating in a circumferential direction with respect to the main body 106. Further, the seal member 148 of the valve body 138 abuts the seat 114 of the main body 106, wherein the coil spring 144 compresses inward, applying a bias to the valve guide body 124 in the direction of arrow A (See, FIG. 1).

Next, the cover member 134 is inserted into recess 118. At this time, as the valve guide body 120 is pressed upon by the cover member, resisting the elastic force of the coil spring 144, the cover member 134 is inserted into the recess 188 in such a manner that the second mating projections 136a–136d do not abut with the first mating projections 122a–122d.

Figure 5:
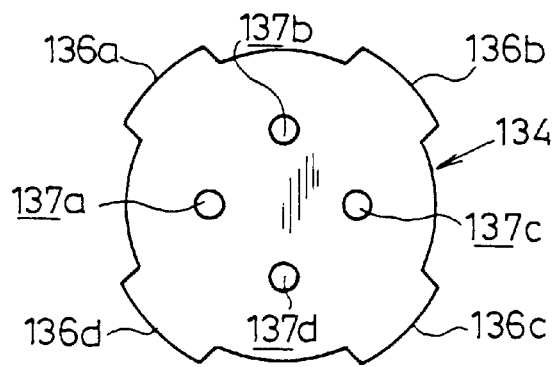
FIG. 5 is a view showing a bottom surface of a cover member employed in the pressure reduction valve of FIG. 1.

Next, the cover member 134 is rotated by a given angle in a circumferential direction with respect to the main body 106, whereby the first mating projections 122a–122d and second mating projections 136a–136d engage one another. Further, the projections 133a, 133b of the valve guide body 124 engage inside either pairs of recesses 137a–137d of the cover member 134 (See, FIGS. 4 and 5). Because the projections 132a–132d of the valve guide body 124 engage within grooves 120a–120d and thereby prevent rotation of the valve guide body 124 in a circumferential direction, the cover member 134 likewise is prevented from circumferential rotation. As a result, there is no concern of unexpected dislocation of the cover member 134.

The valve guide structure in accordance with the first embodiment achieves the following effects and advantages.

Because the pressure which is imposed on the valve guide body 124 disposed in the pressure reduction valve, which is a pressurized fluid device, is supported by the metallic cover member 134, even though the valve guide body 124 is formed from a resinous material, or if some deterioration occurs to the valve guide body 124 due to use over prolonged periods, there is no concern of damage to the valve guide body 124. As a result, durability of the pressure reduction valve 100 employing the valve guide structure 123 is improved.

Further, because the first mating projections 122a–122d formed in a wall constituting the recess 118 in which the valve guide body 124 is inserted, and the second mating projections 136a–136d formed in the cover member 134 engage each other, and thereby prevent the cover member from falling out, damage to the valve guide body 124 can be prevented by means of a simple structure, and it is possible to control soaring production costs for the pressure reduction valve 100 employing such a valve guide structure 123.

Furthermore, by engagement of the projections 133a, 133b formed on an end of valve guide body 124 with recesses 137a–137d defined in the cover member 134, the cover member 134 is prevented from rotation. Hence, any concern that the cover member 134 may become unexpectedly dislocated from the from the pressure reduction valve 100 can be dispensed with. In this case, projections 132a–132d are formed along the axial direction of the valve guide body 124, wherein through engagement of the projections 132a–132d within grooves 120a–120d formed in a wall constituting the recess 116, the valve guide body 124 likewise cannot rotate, and because the cover member 134 does not rotate integrally with the valve guide body 124, any concerns over unexpected dislocation of the cover member 134 can be even further eliminated.

Figure 6:
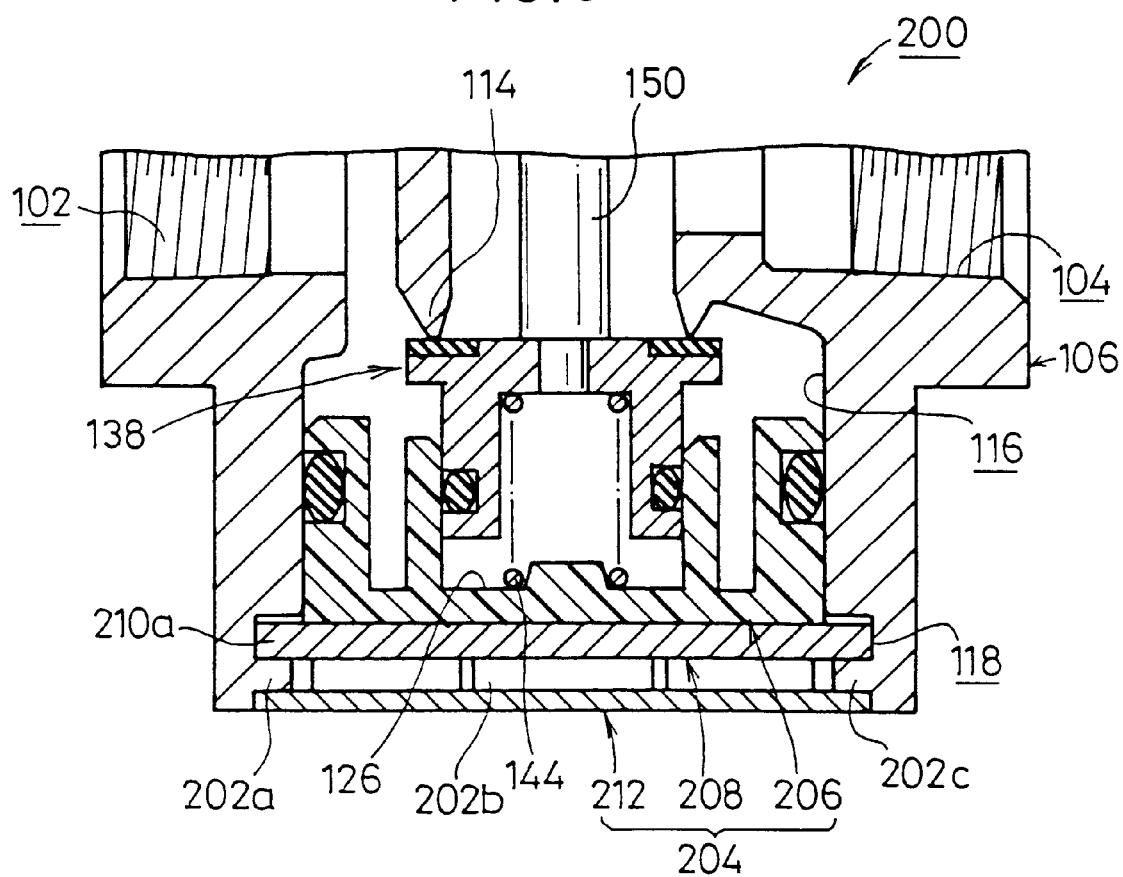
FIG. 6 is a partial expanded vertical cross-sectional view showing a pressure reduction valve employing a valve guide structure according to a second embodiment of the present invention.
Figure 7:
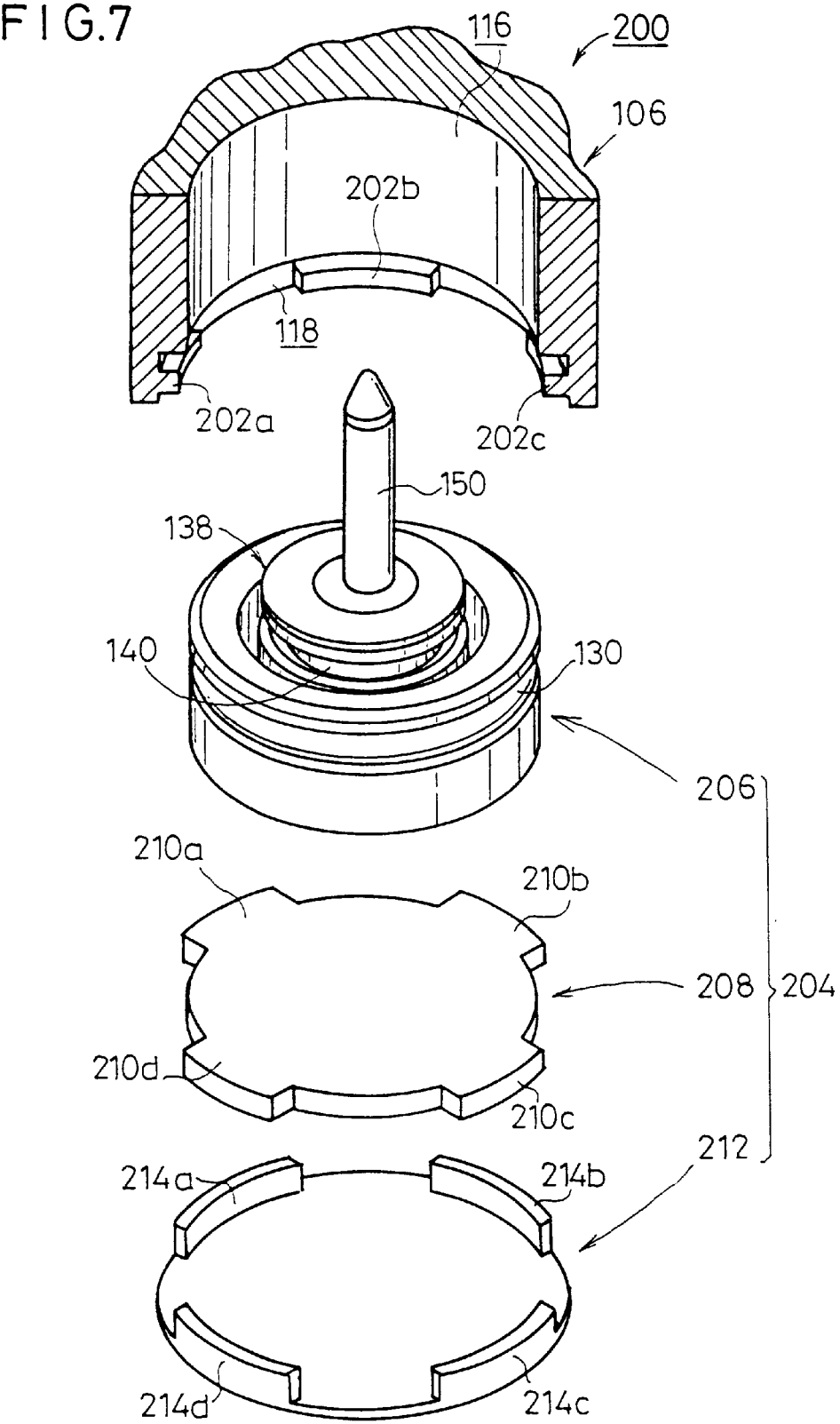
FIG. 7 is an outline exploded perspective view of the valve guide structure of FIG. 6.

Next, an explanation shall be provided, with reference to FIGS. 6 and 7, of a pressure reduction valve 200 employing a valve guide structure in accordance with a second embodiment. In the following descriptions, as well as the figures, structural elements which are the same as those of the first embodiment shall be designated by like reference numerals, and detailed discussion thereof shall be omitted.

A plurality of first mating projections 202a–202d (projection 202d is not shown in the views) are formed in a wall constituting a recess 118 of the pressure reduction valve 200, extending circumferentially around the wall and being mutually offset at 90° from each other.

A cover member 208 formed by a metallic material is affixed to a lower part of the valve guide body 206 making up the valve guide structure 204 of the pressure reduction valve 200. A plurality of second mating projections 210a–210d are formed on the cover member 208 extending circumferentially around an outer periphery thereof, and offset mutually at 90° from each other, the second mating projections 210a–210d being capable of engagement with the first mating projections 202a–202d.

A lid member 212 is inserted into a lower opening of the recess 118. Curved portions 214a–214d are formed perpendicularly along an edge of the lid member 212, wherein by fitting of such curved portions 214a–214d into the wall constituting the recess 218, the lid member 212 blocks the recess 118.

Next, an explanation shall be given of the arrangement by which the valve guide body 206 making up the valve guide structure 204, the cover member 208 and the lid member 212 are fitted into recesses 116 and 118 of the main body 106.

Beforehand, the coil spring 114 and valve body 138 are inserted into the cavity 126 of the valve guide body 206. At this time, the stem 150 is affixed to the valve body 138.

Following completion of the above preparatory steps, the valve guide structure 204 is fitted into the recess 116. At this time, the second mating projections 210a–210d of the cover member 208 are kept out of abutment with the first mating projections 202a–202d, for example, the second mating projection 210a passes through a gap between the first mating projections 202a–202b as the cover member 208 is inserted into the recess 118. The other first mating projections 202b–202d are handled in the same manner.

Next, when the cover member 208 is rotated a predetermined angle in its circumferential direction, the first mating projections 202a–202d and the second mating projections 210a–210d engage one another, thereby preventing the cover member 208 from falling out from the recess 118.

Next, the lid member 212 is fitted into the recess 118. At this time, the curved portions 214a–214d are inserted between adjacent first mating projections 202a–202d. As a result, if the cover member 208 rotates, the second mating projections 210a–210d abut with the curved portions 214a–214d, so that the cover member 208 cannot rotate any further. As a result, mistaken dislocation of the valve guide structure 204 can be prevented.

When a pressurized fluid is introduced to the pressure reduction valve 200, and the pressure of the pressurized fluid is applied to the valve guide body 206, because the pressure imposed on the valve guide body 206 is supported by the metallic cover member 208, there is in no concern of damage to the valve guide body 206 as a result of the pressurized fluid.

With the valve guide structure of the second embodiment, similar to that of the first embodiment, because the pressure imposed on the valve guide body 206 is supported by the metallic cover member 208, there is no concern of damaging the valve guide body 206 which is formed of a resinous material. As a result, durability of the pressure reduction valve 200 employing the valve guide structure 204 is improved.

Further, the first mating projections 202a–202d and the second mating projections 210a–210d engage one another, thereby preventing the cover member 208 from falling out from the recess 118. Hence, damage to the valve guide body 206 can be prevented using a simple structure, and soaring production costs of the pressure reduction valve 200 can be controlled.

Furthermore, in a condition in which the first mating projections 202a–202d and the second mating projections 210a–210d are engaged, the curved portions 214a–214d of the lid member 212 are inserted into gaps between mutually adjacent first mating projections 202a–202d, and hence the cover member 208 is prevented from rotating, and in this case, the cover member 208 cannot accidentally be dislocated and damage the pressure reduction valve 200.

Next, a third embodiment shall be described with reference to FIG. 8.

Figure 8:
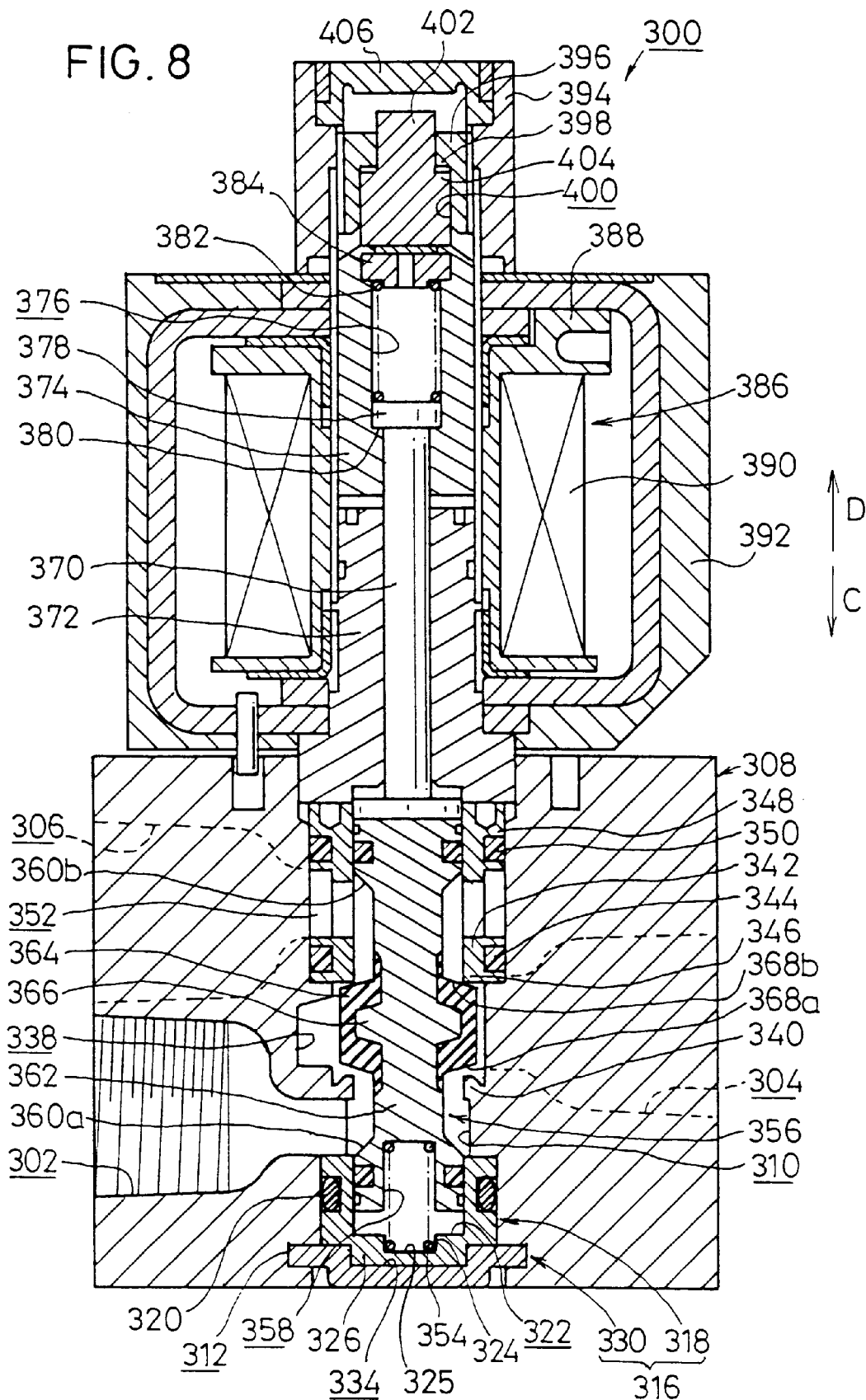
FIG. 8 is a vertical cross-sectional view showing an electromagnetic valve employing the valve guide structure according to a third embodiment of the present invention.
Figure 9:
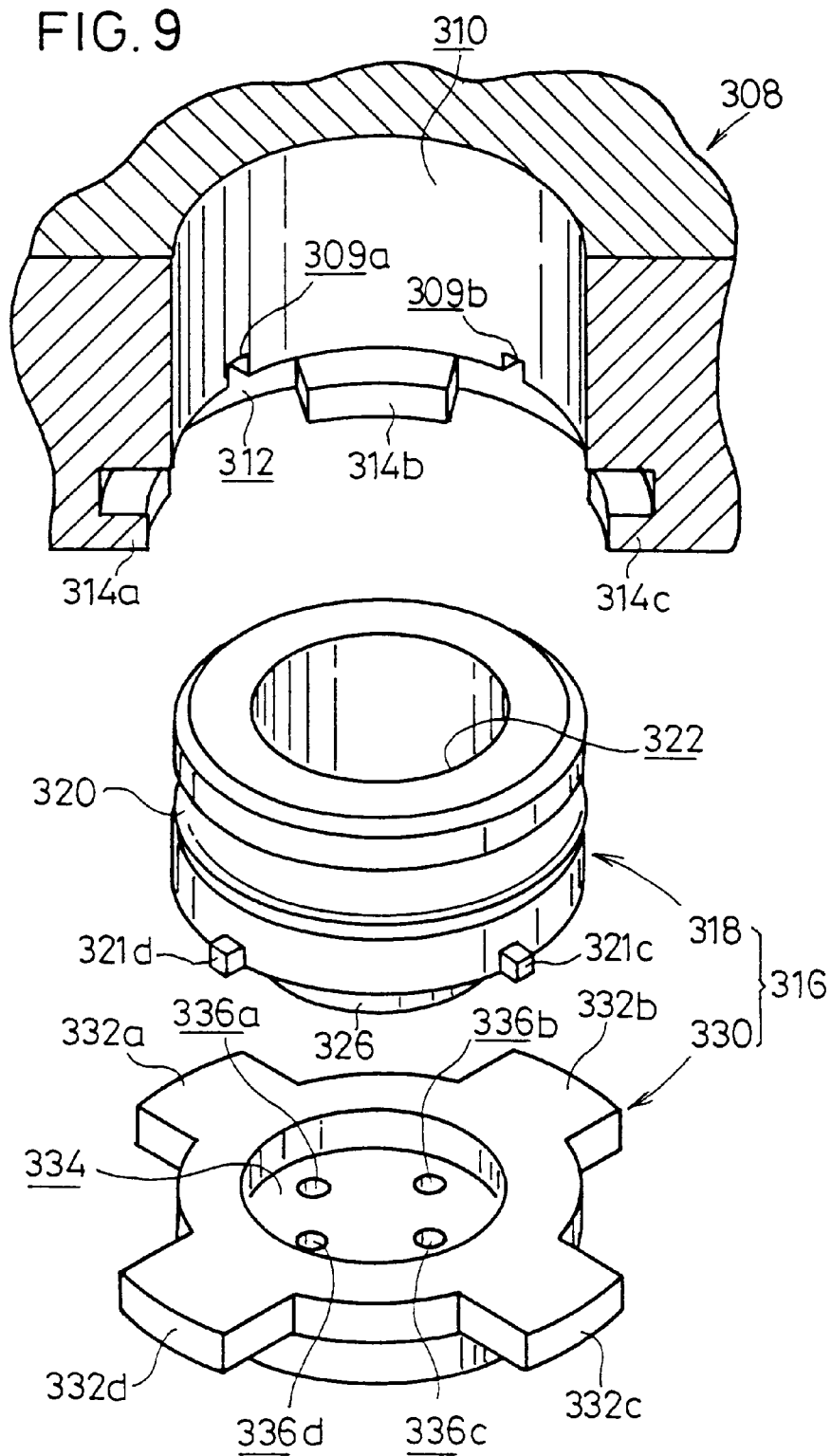
FIG. 9 is an outline exploded perspective view of the valve guide structure of FIG. 8.
Figure 10:
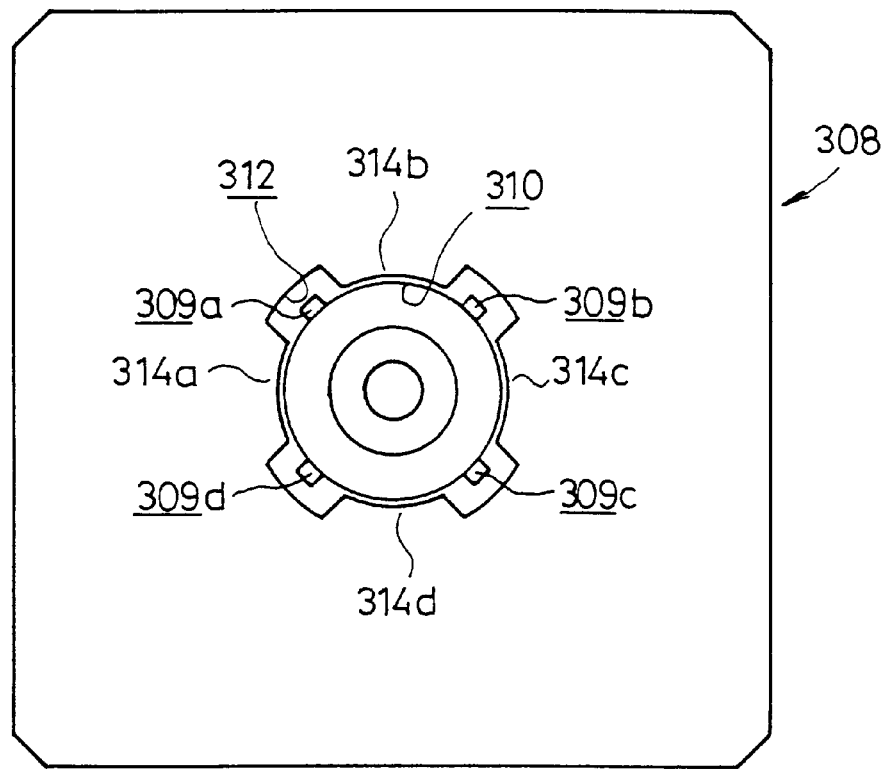
FIG. 10 is a view of a bottom surface of a main body employed in the electromagnetic valve of FIG. 8.

In FIG. 8, reference numeral 300 indicates an electromagnetic valve employing a valve guide structure 316 according to the third embodiment of the present invention. The electromagnetic valve 300 is equipped by a main body 308 in which a first port 302, a second port 304 and a third port 306 are defined, and a recess 310 is defined centrally in the main body, wherein the first port 302, second port 304 and third port 306 communicate with the recess 310. An expanded diameter recess 312 communicates with the recess 310, wherein, as shown in FIGS. 9 and 10, plural grooves 309a–309d are defined extending in an axial direction along the recess 310, wherein bottom portions of the grooves 309a–309d communicate with the recess 312. A plurality of first mating projections 314a–314d are formed extending along a circumferential direction of a wall constituting the recess 312, the projections 314a–314d being offset mutually at 90° from each other.

Figure 11:
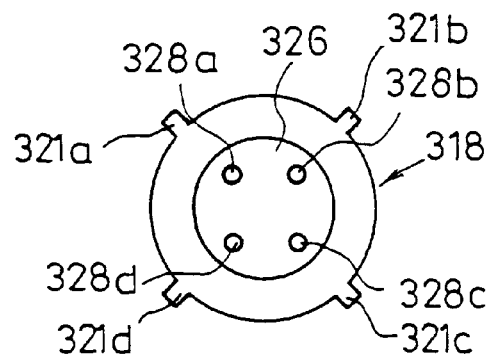
FIG. 11 is a view showing a bottom surface of a valve guide body employed in the electromagnetic valve of FIG. 8.

The valve guide body 318 making up the valve guide structure 316 according to this embodiment is fitted into the recess 310. An o-ring 320 is disposed on an outer periphery of the valve guide body 318, the o-ring serving to prevent leakage of pressurized fluid. A plurality of projections 321a–321d capable of engagement in grooves 309a–309d are also formed on the outer periphery of the valve guide body 318 extending along an axial direction thereof, and being mutually offset at 90° from each other. A cavity 322 is defined in the valve guide body 318, as shown in FIG. 8, with a further cavity 325 being defined through a step 324 at the bottom of the cavity 322. Further, a protuberance 326 is formed at a lower part of the valve guide body 318, wherein as shown in FIG. 11, a plurality of projections 328a–328d are formed on the protuberance 326.

Figure 12:
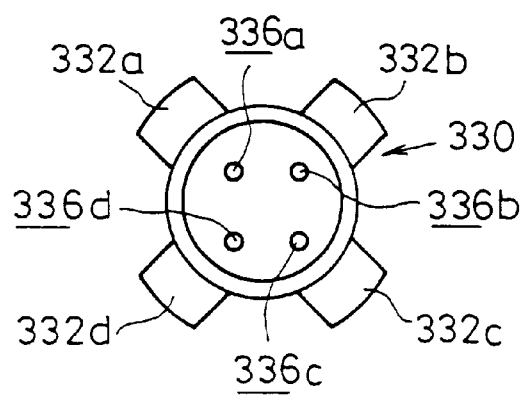
FIG. 12 is a view showing a bottom surface of a cover member employed in the electromagnetic valve of FIG. 8.
Figure 13:
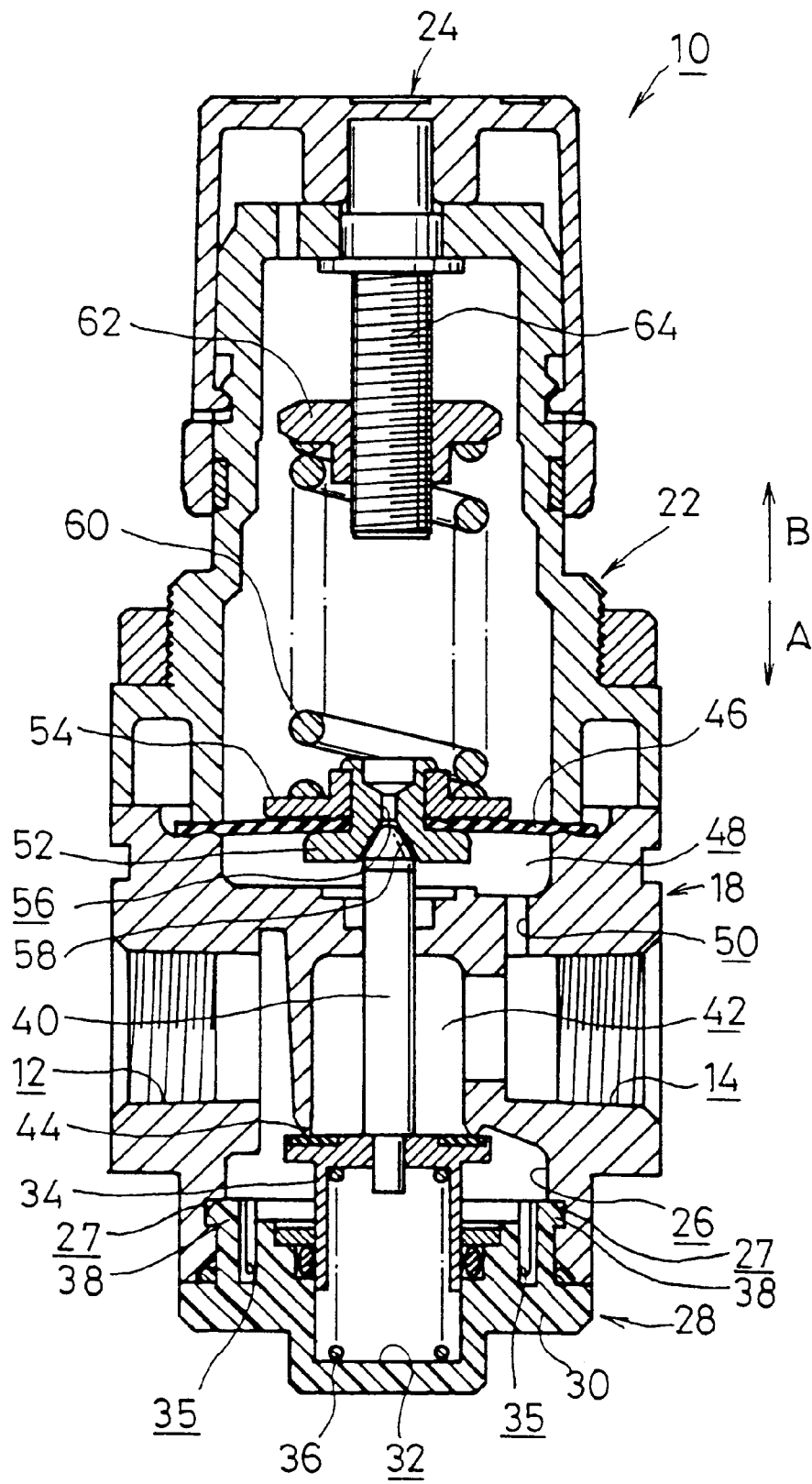
FIG. 13 is a vertical cross-sectional view of a pressure reduction valve employing a valve guide according to conventional practice.
Figure 15:
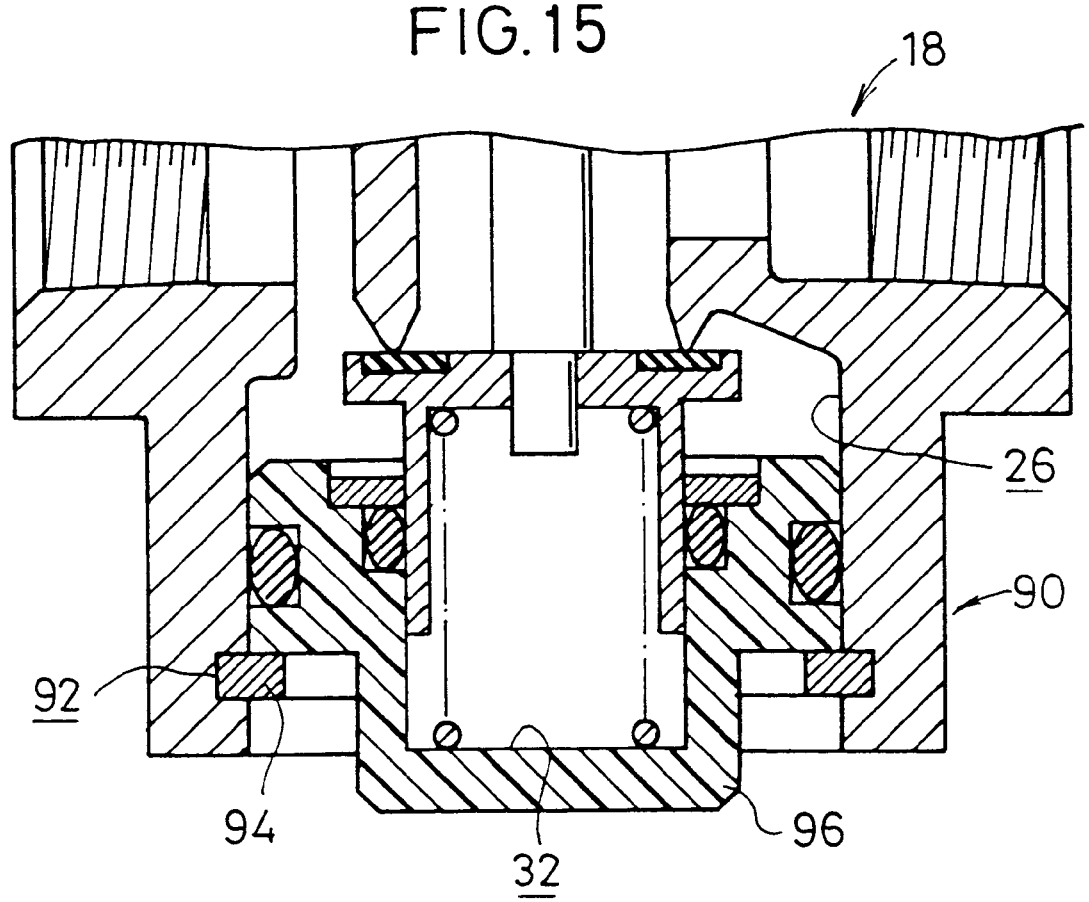
FIG. 15 is a partial expanded cross-sectional view of a pressure reduction valve employing a valve guide according to yet another conventional technique.

A cover member 330 engages a lower part of the valve guide body 318. A plurality of second mating projections 332a–332d capable of engagement with the first mating projections 314a–314d are formed on an outer periphery of the cover member 330 offset mutually at 90° from each other. A cavity 334, which engages the protuberance 326 of the valve guide body 318, is formed on a lower part of the cover member 330, wherein as shown in FIGS. 9 and 12, a plurality of holes 336a–336d capable of engaging the projections 328a–328d are defined at the bottom of the cavity 334. On the cover member 330, in place of holes 336a–336d, it is also acceptable to provide cavities 336a–336d (i.e. non-penetrating recesses or blind holes) which are engageable with the projections 328a–328d.

On a wall constituting the recess 310, as shown in FIG. 8, a groove 338 which communicates with the second port 304 is defined. Further, a seat 340 is formed downwardly of the groove 338 along the wall constituting the recess 310. A ring member 342 is affixed upwardly of the groove 338 on the wall which constitutes the recess 310, wherein an o-ring 344 is disposed on an outer periphery of the ring member 342. A lower part of the ring member 342 forms a seat 346.

A further ring member 348 is affixed to a wall of the recess 310, in a vicinity of an upper opening of the recess 310, wherein an o-ring 350 is disposed on an outer periphery of the ring member 348. A groove 352, which communicates with the third port 306, is formed between ring members 342 and 348.

A substantially cylindrical pole-shaped valve body 356 is slidably disposed in the recess 310. A cavity 358 is defined on a lower end of the valve body 356, wherein one end of a coil spring 354 is seated on a ceiling of the cavity 358, and the other end of the coil spring 354 is seated on the bottom of the cavity 325 of the valve guide body 318. Accordingly, the valve body 356 is normally biased in the direction of arrow D by the coil spring 354. A reduced diameter portion 362 is formed on the valve body 356, along a central longitudinal direction thereof, through gradually reducing tapers 360a, 360b, wherein a center of the reduced diameter portion expands once and a seal 364, formed of a rubber-like elastomeric material, is disposed thereon. More specifically, the seal 364 engages a projecting part formed surrounding an outer periphery of the valve body 356, setting the position thereof. On the seal 364, respective seal surfaces 368a, 368b are formed which abut with seats 340 and 346.

A rod 370 is affixed to an upper part of the valve body 356, the rod 370 being slidably inserted into an interior of a substantially cylindrically shaped guide member 372 affixed to an upper part of the ring member 348. An upper part of the rod 370 is inserted in a recess 376 defined in a displacement member 374, wherein a flange 378 formed on an upper portion of the rod 370 engages a step 380 formed by a wall constituting the recess 376, thereby stopping the rod from being dislodged from the recess 376. One end of a coil spring 382 is seated on an upper part of the flange 378, and the other end of the coil spring 382 is seated on a seat 384 affixed to an upper portion of a wall constituting the recess 376. As a result, the rod 370 is normally biased in the direction of arrow C.

The displacement member 374 is slidably disposed inside of a bobbin 388 which constitutes an electromagnetic coil 386, and a winding 390 comprising wound electrical wiring is formed on the bobbin 388. The electromagnetic coil 386 is covered by a casing 392. A cylindrical member 394 is affixed to an upper part of the casing 392, and a guide member 396 is affixed to an inside of the cylindrical member 394. A recess 400, having a step 398, is defined in the guide member 396, wherein a pin 402 affixed to an upper part of the seat 384 is inserted into the recess 400. A step 404 is formed on the pin 402, the step 404 being engageable with the step 398 of the cylindrical member.

The electromagnetic valve 300 employing a valve seal structure according to the third embodiment is constructed basically as described above. Next, the operation thereof shall be described.

Fluid pressure devices (not shown), for example such as a pressurized air supply source, a cylinder, and a discharge pipe, are respectively connected to the first through third ports 302, 304 and 306. Further, an electrical source is connected to the winding 390 of the electromagnetic coil 386.

When the electrical source is not yet energized, the valve body 356 is displaced in the direction of arrow D by an elastic force of the coil spring 354, and the seal surface 368b of one end of the seal member 364, as shown in FIG. 8, abuts with the seat 346 of the ring member 342, thereby effecting a sealing action. As a result, the first and second ports 302 and 304 are in communication with each other through the groove 338, whereas communication between the second and third ports 304 and 306 is interrupted. In addition, pressurized air from the unillustrated pressurized air supply source connected to the first port 302 is supplied to the cylinder (not shown) which is connected to the second port 304.

When electrical power is supplied from the unillustrated electrical source, the displacement member 374 is displaced in the direction of arrow C under action of the electromagnetic coil 386, wherein the valve 356 is displaced in the direction of arrow C opposing the elastic force of the coil spring 354, by the rod 370 which is displaced in accordance with a guiding operation of the guide member 372. Thus, the other seal 368a abuts the seat 340 performing a sealing action. As a result, communication between the first and second ports 302 and 304 is interrupted, whereas the second and third ports 304 and 306 communicate with each other, and finally, the pressurized air is discharged from the cylinder (not shown) through a discharge conduit (also not shown).

Next, an explanation shall be given of the arrangement by which valve guide body 318, constituting the valve guide structure 316, and the cover member 330 are fitted into recesses 310 and 312 of the main body 308.

First, the coil spring 354 is inserted into the cavity 322 of the valve guide body 318 and the valve guide body 318 is fitted into the recess 310. At this time, the projections 321a–321d formed on the outer periphery of the valve guide body 318 engage in grooves 309a–309d, wherein circumferential rotation of the valve guide body 318 is prevented. Further, the coil spring 354 biases the valve guide body 318 in the direction of arrow C.

Next, the cover member 330 is fitted into the recess 312. At this time, the valve guide body 318 is pressed by cover member 330 in opposition to the elastic force of the coil spring 354, and the cover member 330 is inserted into the recess 312 in a manner such that the second mating projections 332a–332d to not abut with the first mating projections 314a–314d.

Thereafter, when the cover member 330 is rotated a predetermined angle in its circumferential direction, the first mating projections 314a–314d and second mating projections 332a–332d engage each other. At this time, the projections 328a–328d on the valve guide body 318 engage the recesses 336a–336d of the cover member 330. As a result, rotation of the cover member 330 in a circumferential direction is prevented, and hence any concern over unexpected dislocation of the cover member 330 from the main body 308 can be dispensed with.

In the third embodiment of the valve guide structure 316, as with the valve guide structure 123 of the first embodiment, because pressure imposed on the valve guide body 318 is supported by the metallic cover member 330, there is no concern of damage to the valve guide body 318 which is formed of a resinous material. As a result, durability of the electromagnetic valve 300 employing the valve guide structure 316 is improved.

Further, because the first mating projections 314a–314d and the second mating projections 332a–332d engage each other, and prevent the cover member 330 from falling out from the recess 312, damage to the valve guide body 318 can be prevented by a simple structure, and soaring production costs of the electromagnetic valve 300 can be controlled.

Furthermore, by engagement of the projections 328a–328d with recesses 336a–336d, rotation of the cover member 330 is prevented. Still further, by engagement of the projections 321a–321d in grooves 309a–309d, the valve guide body 318 cannot rotate, and since the cover member 330 does not rotate integrally with the valve guide body 318, concern over unexpected dislocation of the cover member 134 can be dispensed with.

What is claimed is:

1. A valve guide structure, comprising:
    a valve guide body which is fitted into a recess defined in a pressurized fluid device, said valve guide body having a closed end;
    a valve body disposed in said valve guide body for movable engagement therewith;
    a resilient member seated on an inner end surface of said closed end and biasing said valve body; and
    a cover member fitted into said recess and supporting said valve guide body by abutment with an outer end surface of said closed end opposite to said inner surface;
    wherein a pressure of a pressurized fluid imposed on said inner end surface of said valve guide body through said valve body is supported by said cover member.

2. The valve guide structure according to claim 1, further comprising:
    a plurality of first mating projections formed extending around a circumference of a wall of said recess and being mutually separated from each other; and
    a plurality of second mating projections which are engageable with said first mating projections formed on said cover member,
    wherein said cover member is stopped from falling out by mutual engagement of said first mating projections and said second mating projections.

3. The valve guide structure according to claim 2, further comprising a lid member fitted into said recess, said lid member having curved sections which are inserted into gaps formed between mutually adjacent said first mating projections, wherein said cover member is prevented from rotating by abutment of said second mating projections with said curved sections.

4. The valve guide structure according to claim 1, further comprising projections formed on an end of said valve guide body, wherein said cover member is prevented from rotating by engagement of said projections with holes or cavities defined in said cover member.

5. The valve guide structure according to claim 4, further comprising projections formed along an axial direction on an outer circumference of said valve guide body, wherein said projections engage with grooves defined in a wall constituting a recess of said pressurized fluid device along an axial direction of said recess, thereby preventing rotation of said valve guide body.

6. The valve guide structure according to claim 1, wherein a valve body is disposed on said valve guide body, and wherein said pressure of the pressurized fluid imposed on said valve guide body through said valve body is supported by said cover member.

7. A valve guide structure, comprising:
    a valve guide body which is fitted into a recess defined in a pressurized fluid device;
    a cover member fitted into said recess and supporting said valve guide body; and
    a lid member fitted into said recess, said lid member having curved sections which are inserted into gaps formed between mutually adjacent said first mating projections, wherein said cover member is prevented from rotating by abutment of said second mating projections with said curved sections;
    wherein a pressure of a pressurized fluid imposed on said valve guide body is supported by said cover member.

8. A valve guide structure, comprising:
    a valve guide body which is fitted into a recess defined in a pressurized fluid device;
    a cover member fitted into said recess and supporting said valve guide body; and
    projections formed on an end of said valve guide body, wherein said cover member is prevented from rotating by engagement of said projections with holes or cavities defined in said cover member;
    wherein a pressure of a pressurized fluid imposed on said valve guide body is supported by said cover member.

9. The valve guide structure according to claim 8, further comprising projections formed along an axial direction on an outer circumference of said valve guide body, wherein said projections engage with grooves defined in a wall constituting a recess of said pressurized fluid device along an axial direction of said recess, thereby preventing rotation of said valve guide body.

* * * * *